United States Patent Office 3,513,931
Patented May 26, 1970

---

3,513,931
VEHICLE AUTOMATIC GUIDANCE MEANS
Michael George Reeve Warner and Gwilym Owain Harries, Bedford, England, assignors to National Research Development Corporation, London, England, a corporation of Great Britain
Filed July 26, 1967, Ser. No. 656,087
Claims priority, application Great Britain, July 26, 1966, 33,634/66
Int. Cl. B62d *1/24, 5/06*
U.S. Cl. 180—98  3 Claims

ABSTRACT OF THE DISCLOSURE

Automatic vehicle guidance systems in which a guide feature is scanned transversely so as to enable the position of the feature to be sensed relative to a selected point of the scan and steering means are operated in dependence upon the deviation of the "observed" position from the selected point to tend to maintain the two in predetermined relationship. Ultrasonic transducers are used in echo rangesounding arrangements where the guide feature is in the form of a step, such as the side of a furrow when ploughing. Mechanical traversing of a single pair of transducers, as well as switched scanning of a multiplicity of pairs in line are disclosed.

---

This invention relates to improvements in vehicle guidance means, and one particular use to which the invention can be applied is the guidance of a tractor drawing an agricultural implemet or the guidance of a self-propelled agricultural implement.

As the cost and the amenity demands of labour increase, it becomes more and more desirable to replace machine operators with automatic machine controls, and in the field of agriculture proposals have been made for the guidance of tractor drawn implements, for example, by the use of leader cables buried in the soil and followed automatically by the tractor. Such a system of leader cables has a limitation as regards initial cost and in the possibility of discontinuities developing in use when the ground is covered with a crop and when, therefore, the cables are not accessible; and there is also a limitation as to the need to establish, when laying the leader cables initially, a tractor movement pattern which may not suit all the crops to be grown at different times in the field.

An object of the present invention is the provision of a vehicle guidance system which avoids these limitations.

According to the invention means for the automatic guidance of a vehicle includes scanning means on the vehicle which is arranged repeatedly to scan across a guide line or the like that the vehicle is required to follow, said scanning means being adapted to detect some feature of the guide line or the like and to sense where, in the scan, said feature occurs with respect to a selected point in the scan and steering means controlled in accordance with the deviation from the said selected point of the actual detected point in the scan, said steering means being arranged to correct any substantial deviation by appropriate operation so as to tend to maintain the said feature of the guide line or the like in desired relationship with the said selected point in the scan.

The particular feature subject to detection may be the edge of a strip laid on or applied to, as by painting, the surface over which the vehicle travels, or it may be a contour as, for example, the edge of a ploughed furrow or of a kerb, which may be detected, for instance, by reason of a change of depth below, or distance from, the vehicle, or possibly by change of colour or consistancy. The actual form of the feature, however, has no direct bearing on the scope of the invention and it may be of any convenient form; it may even comprise the edge of a standing crop that is to be harvested. Other forms will be apparent to those skilled in a particular art to which the invention is to be applied and yet further forms will become apparent as the occasion arises.

According to another aspect of the invention, vehicle guidance means include scanning means arranged to scan repeatedly, in a direction transverse to the direction of movement of the vehicle, the contour of a physical feature of a guide line or the like which the vehicle is required to follow, means for detecting the contour being scanned, means for ascertaining whether this contour occurs at, to the left of, or to the right of a selected point in the scan, and steering means for the vehicle controlled in accordance with the relative positions of the said contour and the selected point, in such a manner that any substantial deviation of the said contour from the selected point is corrected by appropriate operation of the vehicle steering system.

According to yet another aspect of the present invention, vehicle guidance means include scanning means arranged to scan repeatedly in a direction transverse to the direction of movement of the vehicle, the contour of a physical feature of a guide line or the like which the vehicle is required to follow, means for detecting step-like change transverse to the contour being scanned, means for ascertaining whether this step-like change occurs at, to the left of, or to the right of a selected point in the scan, and steering means for the vehicle controlled in accordance with the relative positions of the step-like change and the selected point in such a manner that any substantial deviation of the step-like change from the selected point is corrected by appropriate operation of the vehicle steering means.

Where there is a difference of height to be detected, the scanning means may utilise a first transmitting ultrasonic transducer to direct pulsed ultrasonic energy towards the physical feature and a second receiving ultrasonic transducer arranged to receive reflected ultrasonic energy, and the means for detecting the different of heights across the contour then utilises the magnitude of the time lag between each transmitted pulse and the return or echo pulse received by the second transducer to effect control of the steering.

The scanning means may, alternatively, include photoelectric means which may detect changes of intensity or colour to one side or the other of the guide line. Thus, when used for ploughing, the scanning means may be arranged to scan the edge of the furrow by ultrasonic means as mentioned above, or a photoelectric device may be used to detect the edge of the furrow by sensing the change from the furrow to the undisturbed soil, possibly by sensing the colour change from earth to foliage.

The invention will now be described, by way of example, with reference to the accompanying drawings, in which.

Figure 1:
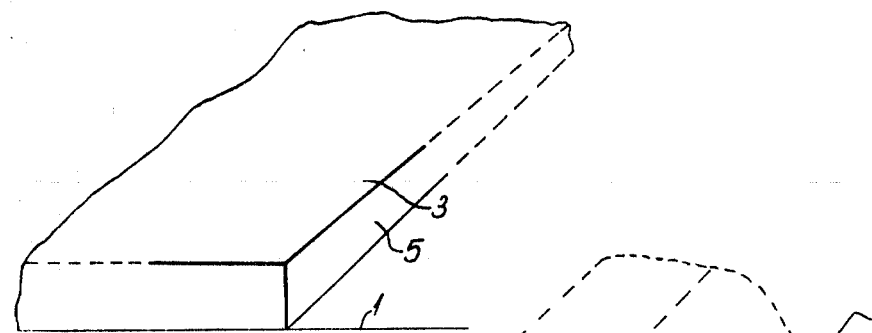
FIGS. 1 and 2 are perspective drawings of two forms of physical contour which an agricultural implement might be required to follow.

Referring first to FIG. 1, this figure depicts a substantially level ground surface 1 on which ground is growing a grass crop 3 having an erect posture and partially cut by the action of a harvesting machine to leave a straight clean edge 5. When the harvesting machine has to make its next traversal of the ground to cut the next swathe of crop, the driver of the tractor towing the harvesting machine normally judges the optimum path for his tractor to cut as wide a swathe as possible with the harvesting machine while leaving no crop uncut and while giving himself a straight clean edge for his next traversal.

Figure 2:
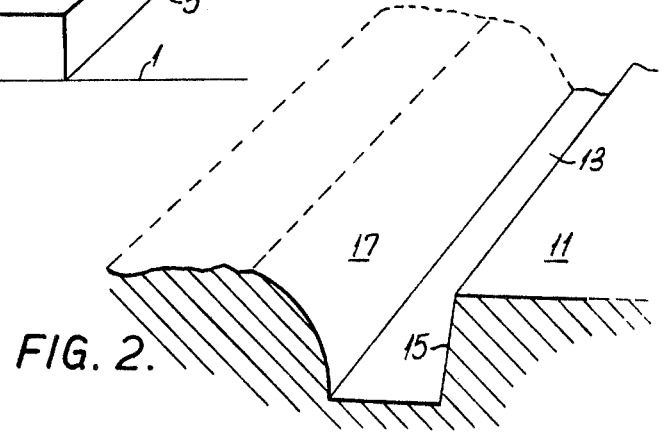

Referring now to FIG. 2, this figure depicts an initially level ground surface 11, in which ground has been cut a furrow 13 having one substantially vertical edge 15 and a curved opposite edge 17. When the ploughing implement is required to make the next furrow, the driver of the tractor towing the ploughing implement judges the optimum path of his tractor with the object of cutting a straight furrow while turning over all the soil, the displaced earth being used to fill the preceding furrow. In some cases the soil may be left in ridges.

Figure 3:
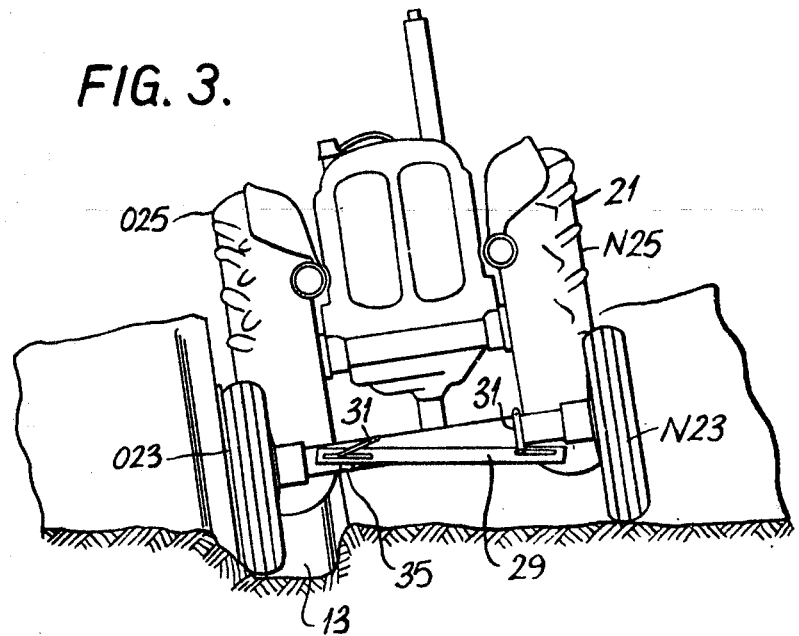
FIG. 3 is a front view of a tractor towing a ploughing implement (not shown) and provided with automatic guidance means causing it to follow a furrow.

FIG. 3 illustrates a tractor 21 having front and rear wheels N23 and N25 on one side and front and rear wheels O23 and O25 on the other side. In ploughing a further furrow, the tractor is driven with the wheels O23 and O25 in the furrow 13 of FIG. 2, while the wheels N23 and N25 are on the unploughed soil. Thus the tractor is tilted over towards the one side as shown. It will be appreciated that if the field is ploughed circumferentially the tractor will remain in this stance, but if the field is ploughed by traversals and reverse traversals by the plough, then during alternate traversals the tractor will be tilted to one side and during the intervening traversals the tractor will be tilted to the other side.

Mounted on the front of the tractor is a cross member 29 which is held in position by two links 31 pivotally fixed to the main frame of the tractor and clamped to the member 29 by threaded bolts extending through slots in the member, which slots extend parallel to the length of that member. By this means the member 29 can be adjusted to and clamped at an inclination to the main frame of the tractor so that, when the tractor is itself tilted to one side as shown in FIG. 3, the member 29 is substantially parallel to the ground surface. A carriage 35 (see FIGS. 4 and 5) is slidably mounted on the cross member 29 so that it can reciprocate to and fro along the length of the member, and is coupled by a pivoted link 37 to a crank disc 39 driven through a speed reducing gear box 41 by an electric motor 43. As the motor 43 rotates, it moves the carriage 35 to and fro through a distance of about ten inches.

Mounted on the carriage 35 are two ultrasonic transducers 45 and 47 arranged side by side and both directed downwardly, the plane containing their axes being parallel to the longitudinal axis of the tractor. Transducer 45 is utilised as a transmitter, and transducer 47 is utilised as a receiver, and the carriage is so arranged that when the tractor is positioned correctly with respect to the furrow the centre point of the length of the scanning to-and-fro movement of the carriage is directly above the substantially vertical furrow wall or edge 15.

Figure 6:
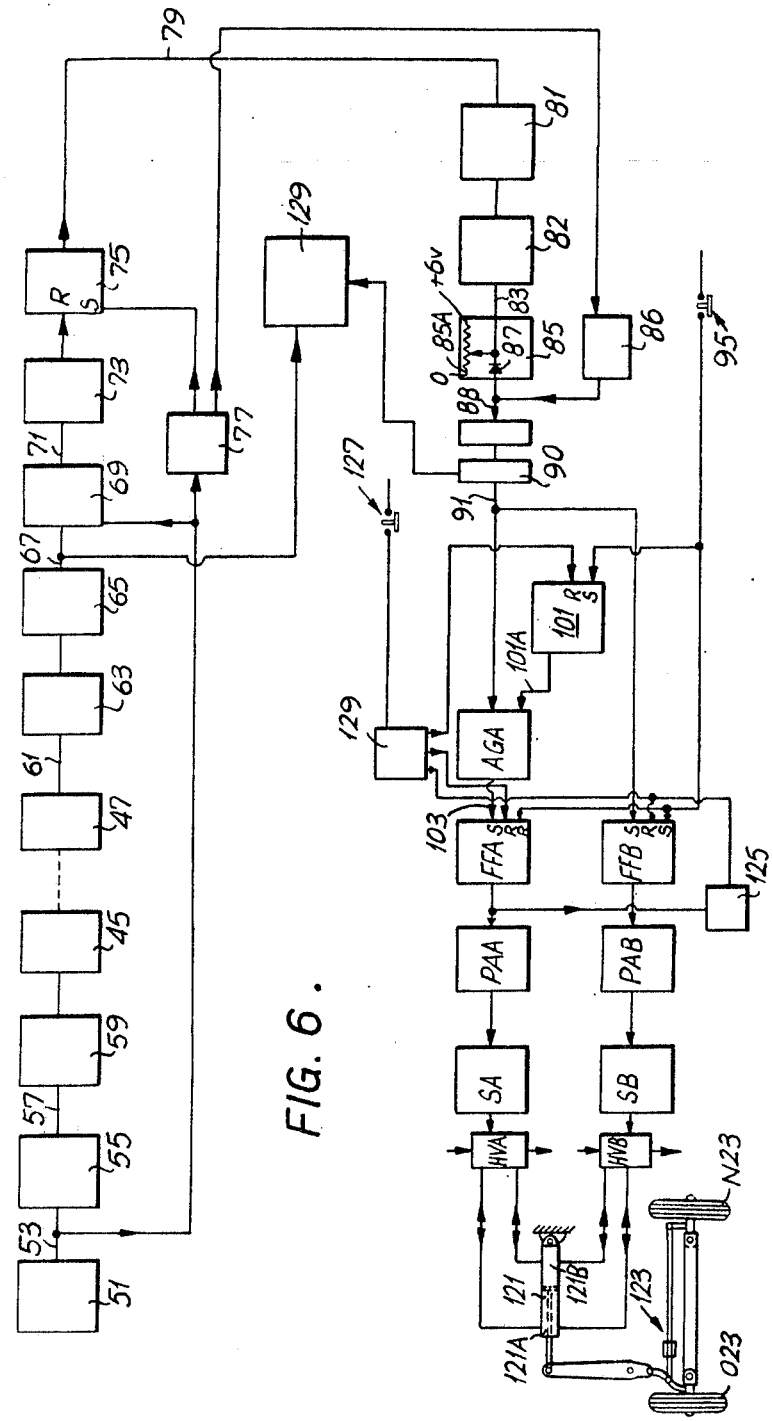
FIG. 6 is a block diagram of the automatic guidance means referred to above.

The two transducers are connected into an electrical circuit which is indicated in block diagram form in FIG. 6. A pulse generator 51 provides electrical pulses having a pulse width of 0.5 millisecond at a pulse repetition rate of 120 pulses per second. These pulses are applied through lead 53 to a square wave oscillator 55 having a frequency of 150 kilocycles per second and controlled by the pulses on lead 53 so that its output on lead 57 is in the form of a pulsed alternating signal at the frequency of 150 kc./s. This signal is applied to a power amplifier 59 the output of which is applied to the transmitting transducer 45. The amplitude of the voltage applied to the transducer is approximately 100 volts peak-to-peak and the peak current during the pulse is approximately 180 milliamperes.

The receiving transducer 47 is connected by a lead 61 to an amplifier 63 consisting of two tuned radio frequency stages, and the output from the amplifier is applied to a frequency changing and intermediate frequency amplifying unit 65 which provides as output on lead 67 a positive-going pulse approximately 2 volts high for each pulse received from the transmitting transducer 45. Lead 67 applies these pulses to an inverter amplifier 69 to which is applied also the pulses on 53. In amplifier 69, the pulses from lead 67 are inverted and amplified and added to the pulses from lead 53, so that the output pulses on lead 71 consist of pairs of pulses corresponding respectively to the transmitted and the received pulses. These pairs of pulses are applied through a pulse shaping circuit 73 to the "RESET" input of a flip-flop circuit 75, to the "SET" terminal of which is applied the pulses from lead 53 through a pulse delay circuit 77. This pulse delay circuit 77 is in the form of a Schmidt trigger circuit which is switched into its quasi-stable state by the positive going edge of the pulse from lead 53 and gives a negative going output pulse with a positive-going trailing-edge which is 1 millisecond behind the set pulse trailing edge. The flip-flop circuit 75 is set by the positive-going trailing-edge into a state in which a binary 1 in the form of an output voltage of 4 volts appears at its output lead 79. When circuit 75 is set into its other state a binary 0 in the form of an output voltage of 0.2 volt appears on the lead 79. This output voltage is applied to a ramp generator 81, which includes a constant current charging circuit for a capacitor controlled by a transistor. The arrangement is such that this transistor prevents charging of the capacitor if the output from flip-flop 75 is a binary 1. Thus when a delayed pulse passing from lead 53 through delay circuit 77 brings flip-flop 75 into a binary state 0, the capacitor will begin to charge and a voltage increasing linearly with time will appear across it. The charging of this capacitor is terminated when the shaped return signal from the pulse shaping circuit 73 resets the flip-flop 75, whereupon the partly charged capacitor is rapidly discharged internally of the ramp generator. If for any reason no return signal appears, then the undelayed next pulse from lead 53 passing through the pulse shaping circuit 73 will reset the flip-flop 75. The ramp signal is applied to a differentiating circuit 82 and sharp positive going pulses are produced, the height of which correspond to the height of the ramp wave form which in turn depends on the length of the return path between the transmitter transducer 45 and the receiver transducer 47.

These pulses are applied to output lead 83, which is connected to a pulse height discriminator 85 consisting of a potentiometer 85A across which is applied a direct voltage and having its slider coupled directly to the lead 83 and through a diode 87 to output lead 88. By setting the slider of the potentiometer properly, only those pulses which have an amplitude greater than a predetermined voltage, the bias applied to the diode, are able to proceed to lead 88. Lead 88 applies the pulses through an inverter circuit 89, which changes positive pulses into negative pulses, as input to a trigger circuit 90 which, when operated by a negative pulse on the lead, produces on lead 91 corresponding pulses which have very sharp edges in order to satisfy the requirements of the subsequent logic circuits.

The operation of the circuit so far described will be given in detail below, but at this stage it is necessary to appreciate that the ultrasonic pulses emitted by the transmitting transducer 45 will be received by the receiving transducer 47 with a time delay that will depend upon the length of the go-and-return path between the two transducers. Thus in use a pair of associated pulses will be received relatively close together, and pairs of pulses will be received 120 times each second. The interval between a pair of pulses indicates the length of the go-and-return path, so that the magnitude of the pulses on lead 83 indicates the length of this go-and-return path, and by the action of the discriminator 85 only the pulses corresponding to go-and-return path lengths greater than a predetermined value will be passed to the logic circuits. The change-over point from "no-pulses" to "pulses" occurs when the scanning transducers pass over the vertical edge 5 of the furrow. If the tractor is properly positioned, this occurs at exactly the mid-point of the scan.

To provide information as to the passing by the scanning transducers of the midpoint of the scan, a microswitch 95 is provided on the cross member 29 and is arranged to provide a signal pulse as the scanning carriage passes the mid-point of its scan.

Lead 91 is connected to the input of AND gate AGA. The microswitch 95 is connected to the input of a monostable circuit 101 which in a first stable state provides a signal on its output 101A and in its second stable state provides no signal on output 101A, the circuit changing between its first and second state each time it receives an input trigger signal from the mid-point switch 95. Output 101A provides the second input to the AND gate AGA. Thus an input signal pulse on lead 91 causes an output signal to be set up on the output lead 103 of gate AGA if the carriage 35 is to the right (in FIG. 3) of the mid-scan point. The output lead 103 provides the SET input of a flip-flop circuit FFA and the lead 91 provides the SET input of a flip-flop circuit FFB. The switch 95 is arranged to apply inputs to the SET input of the flip-flop circuit FFB and to the RESET input of circuit FFA. The output of flip-flop circuit FFA is applied to a power amplifier PAA the output of which controls the energisation of a solenoid SA. The output of flip-flop circuit FFB is applied to a power amplifier PAB the output of which controls the energisation of a solenoid SB.

The tractor 21 is provided with a hydraulically actuated steering mechanism indicated diagrammatically in FIG. 6, and a double-acting hydraulic cylinder 121 the ram of which is coupled to the steering linkage 123 of the tractor front wheels N23 and O23. The two solenoids SA and SB control the operation of two hydraulic control valves HVA and HVB respectively, and when solenoid SA is energised hydraulic fluid under pressure is caused to flow into end 121A of the cylinder 121 and hydraulic fluid is vented from end 121B of that cylinder, while when solenoid SB is energised the opposite action takes place. The two valves HVA and HVB are conveniently provided on a common spool which reverts to a central position when neither of the solenoids SA and SB is energised.

A delay circuit 125 has its input connected to the output from flip-flop circuit FFA and has its output applied to the reset terminal of the flip-flop circuit FFB. After the AND gate AGA is reset by a mid-point pulse from switch 95, it provides an output pulse to circuit 125 which, while recovering to its stable state, provides a pulse about 0.5 millisecond after the arrival at AND gate AGA of its setting pulse from switch 95, resets that gate.

Figure 4:
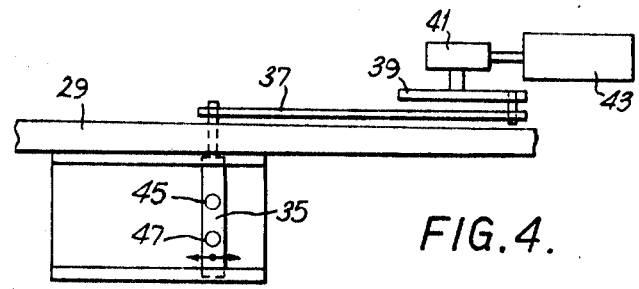
FIG. 4 is a plan view of an oscillating carriage shown in FIG. 3.
Figure 5:
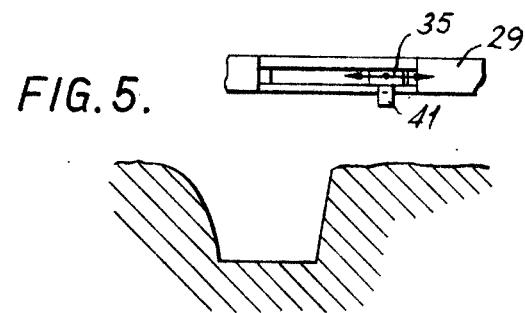
FIG. 5 is a front view of the carriage shown in FIG. 4.

A microswitch 127 is arranged to be actuated briefly by the cariage 35 as it reaches the end of its active scan, i.e. towards the left in FIGS. 3, 4 and 5, and this microswitch is connected to a circuit 129 containing a relay having normally open contacts and operated by the microswitch through a capacitor so that only momentary operation of the relay is obtained. The contacts of the relay are in the reset lines of the circuits 101, FFA and FFB, so that operation of the microswitch 127 resets all those circuits.

Considering now the operation of the tractor guidance system described above, the electric motor 43 continuously drives the crank disc 39 which through the link 37 causes the carriage to move to-and-fro through a distance of about 10 inches about a mid-point. The tractor is towing a plough implement, which is so positioned transversely of the tractor that if the mid-point is vertically above the substantially vertical edge 15 of the furow the ploughing implement will be properly positioned to plough the next furrow. The transmitting transducer 45 is continuously transmitting ultrasonic pulses and these are picked up by the receiving transducer 47. The time lag between the transmission of a pulse and its receipt by the transducer 47 is indicative of the total go-and-return path between the two transducers. This time lag will remain substantially constant during the active scan by the carriage (i.e. towards the left in FIG. 3) until the scanning beam passes the substantially vertical edge 15 of the furrow. When this happens, the time lag will suddenly increase.

Considering first the situation in which the tractor is properly positioned with respect to the furrow edge 15, with the mid-point switch 95 providing a pulse at the instant that the substantially vertical edge 15 of the furrow is scanned, and with the piston of steering cylinder 121 in its central position so that the front steering wheels O23 and N23 of the tractor are centralised. Over the first half of the scan, the time interval between transmitted pulse and received pulse will be relatively small, as a result of the short go-and-return path between the transducers and the earth. As a result of the setting of the slider of the potentiometer 85A, these pulses are blocked in the discriminator 85 and never reach the logic circuits fed by the lead 91. AND gate AGA lacks one of its inputs, and so no output signals are passed to the logic chains. Both flip-flops FFA and FFB are in the RESET states to which they were restored as the reset switch 127 was closed during the last movement of the carriage 35. Both of the hydraulic control valves HVA and HVB are set at neutral positions in which the supply of hydraulic fluid to, and the venting of hydraulic fluid from each end of hydraulic cylinder 121 is prevented. Thus the vehicle steering 123 is locked against movement from its existing central position.

Considering now the situation when the tractor is displaced towards the left in FIG. 3 from its optimum position, so that during the active scan by the carriage 35 the step-like change in the time taken for the ultrasonic energy to pass from transmitter transducer 45 to receiver transducer 47 takes place before the signal pulse is received from the mid-point switch 95. Since the carriage 35 is to the right of the mid-scan point, the monostable circuit 101 is providing one of the two inputs of AND gate AGA. Once the step-like change takes place, the signals on lead 83 are able to pass the discriminator 85 and the pulses appearing on lead 91 are applied as the second input of AND gate AGA. Gate AGA then sets the flip-flop FFA which through the amplifier PAA energises the solenoid SA which in turn supplies hydraulic fluid under pressure to the end 121A of the cylinder 121 and vents hydraulic fluid from the cylinder end 121B. This provides a corrective movement of the steering wheels O23 and N23 towards the right in FIGS. 3 and 6.

Shortly afterwards, the mid-point pulse arrives from switch 95, and this pulse (1) resets the flip-flop circuit FFA, so turning off the solendoid SA and stopping the steering correction action but leaving the steering locked in its new position; and (2) by changing over the state of the monostable circuit 101, it removes one input from AND gate AGA which then cannot pass on any more pulses from lead 91.

It will be seen that the magnitude of the steering correction applied will depend upon the time interval between the step-like change in the time between pulses and the arrival of the signal pulse from the mid-scan switch 95. This again depends upon the actual linear displacement error of the tractor and the speed at which the carriage 35 is moved over its scan.

In the situation when the tractor is displaced towards the right in FIG. 3 from its optimum position, a similar operation occurs but this time it is solenoid HVB which is energised and this valve supplies hydraulic fluid under pressure to the end 121B of the cylinder 121 and vents hydraulic fluid from the cylinder end 121A to apply an opposite corrective movement of the steering wheels O23 and N23 towards the left in FIGS. 3 and 6. In this case, since the signal from switch 95 comes before the pulses on lead 91, there is no need to use a circuit analogous to delay circuit 125.

Whatever the position of the tractor relative to the substantially vertical furrow edge 15, at the end of its scan the carriage 35 operates microswitch 127 which through the circuit 129 resets the monostable circuit 101 and the flip-flop circuits FFA and FFB.

It will happen from time to time, in view of the fact that the reflecting medium is non-homogeneous soil, that a pulse transmitted by transducer 45 will not be returned to the transducer 47. When this happens, the ramp voltage will be terminated not by the shaped return signal from receiver transducer 47 but by the transmitted pulse signal on lead 53 as applied to the inverter amplifier 69. When this happens, a large ramp voltage will be generated and produces a pulse on lead 83 which is larger than the pulses which correspond to scanning of the furrow floor. This can give a false indication of the substantially vertical edge 15 of the furrow, and could possibly cause a steering correction in the wrong direction. These false pulses are excluded by a diode gate, operated by a timer circuit initiated by the delayed SET pulse. This gate allows pulses to pass from discriminator 85 to trigger circuit 90 only during a period overlapping the longest time delay expected of a properly reflected pulse.

It will be appreciated that the action of circuit 101 is to render the logic circuits inactive during the return movement or scan of the carriage 35.

The tractor guidance system described above is able to cause a tractor to follow a desired physical feature, for example a furrow edge, and it can be readily modified to follow other physical features such as a kerb or the abrupt edge of a standing crop.

It is to be noted that the system described above provides a proportional control since the magnitude of the deviation controls the length of the time intervals during which hydraulic fluid is fed to the steering actuator.

In order to provide an improved response by the tractor to measured error, a feedback can be provided from the steering mechanism to the means for sensing positional error in the tractor. Thus the impulses supplied to the steering mechanism can be caused to move bodily, with respect to the tractor, a further carriage carried by the member 29 and itself carrying the parts 35, 37, 39, 41, 43, 45 and 47. This feedback can thus take the form of a mechanical link from the steering actuator, which link moves the further carriage along the member 29. This can be arranged to ensure that the steering error is corrected with little overshoot.

Figure 7:
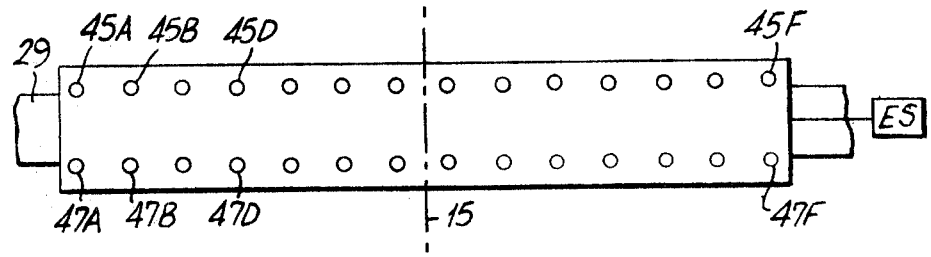
FIG. 7 is a diagram illustrating an alternate scanning system using an array of transducers.

In the apparatus described above, the scanning of the furrow is effected mechanically by physical movement of the two transducers 45 and 47. In an alternative arrangement illustrated in FIG. 7, a multiplicity of pairs of transducers are provided, for example a set of transmitting transducers 45A . . . 45F and a set of corresponding receiving transducers 47A . . . 47F. These transducers are electrically or electronically switched by switching means ES so that they operate in sequence in pairs, each pair, for example, transmitting transducer 45A and receiving transducer 47A, or transmitting transducer 45D and receiving transducer 47D, only one pair being active at a time. The scanning effect produced is similar to that produced by one pair of transducers being moved bodily in a step-like manner over the distance spanned by the set of transducers.

Alternatively, the sets of transducers can be arranged to be continuously energised and thus continuously to sense the level of the soil beneath; and the edge of the furrow can be sensed by scanning the set of transducers, electrically or electronically. Here, again the scanning effect produced is similar to that produced by a single pair of transducers being moved bodily in step-by-step scanning motion.

Since there may be interference between pairs of transducers in the continuously actuated version, it may be necessary to arrange that different pairs work at different frequencies so that there is no "cross-talk" between pairs. The other possibility is to arranged that there is sufficient spacing or shielding between them in which case it may be possible to use the same frequency for each.

Figure 8:
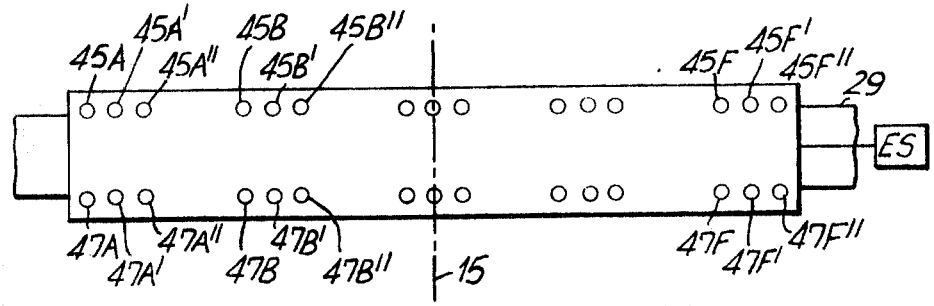
FIG. 8 is a diagram similar to FIG. 7, illustrating an alternative array of transducers.

In a further alternative, where pairs of transducers are switched sequentially, the pairs can be grouped for switching, pairs within each group operating at different frequencies but each group being substantially identical. Thus since it is necessary to have the pairs of transducers within a comparatively small overall spacing—the mechanical version had a scanning path of ten inches—it is probably advantageous to operate with, say, groups of three pairs. One possibility is to use five such groups as indicated in FIG. 8 and the switching time through the complete set can then be reasonably fast through the switching means ES so that the tractor will not advance through too great a distance between scans. In the relatively dirty conditions under which an agricultural tractor normally operates, working with such sets of transducers is advantageous in that it reduces the number of moving parts which are required.

In an arrangement in which the "mechanical" scanning is replaced with "switched" scanning, the feedback from the steering actuator can be electrical, for example by use of a voltage derived from a potentiometer. Feedback can be applied from a potentiometer, responsive to the adjusted position of the vehicle steering, to a biassing winding or windings on a magnetically operated hydraulic valve, the valve necessarily being not of the "off" and "on" type but of the "proportional" type.

Other variants will be apparent to suit particular circumstances.

We claim:

1. Automatic guidance means for guiding a vehicle along a course related to a contour of a physical feature disposed in or alongside said course, scanning means on the vehicle for scanning, over a range, the physical feature repeatedly transversely of the direction of travel of the vehicle and across said contour, transducer means operatively associated with said scanning means and directed downwardly at said physical feature, said transducer means including a plurality of transmitters and receivers dispersed in pairs throughout said range of scan, and switching means for causing said pairs to operate in sequence, sensing means associated with said transducer means for sensing where in said range of scan the contour occurs with respect to a selected point in the scan, and steering means, controlled in accordance with deviation of the point of detection of the contour from its desired relationship with said selected point, for steering said vehicle to reduce said deviation.

2. Automatic guidance means for guiding a vehicle along a course related to a contour of a physical feature disposed in or alongside said course, scanning means on the vehicle for scanning, over a range, the physical feature repeatedly transversely of the direction of travel of the vehicle and across said contour, transducer means operatively associated with said scanning means and directed downwardly at said physical feature, said transducer means including a plurality of transmitters and receivers dispersed in pairs throughout the range of scan and including switching means for causing groups of said pairs to operate in sequence, sensing means associated with said transducer means for sensing where in said range of scan the contour occurs with respect to a selected point in the scan, and steering means, controlled in accordance with deviation of the point of detection of the contour from its desired relationship with said selected point, for steering said vehicle to reduce said deviation.

3. Automatic guidance means as claimed in claim 2, wherein the pairs of transmitters and receivers of each group have different operating characteristics.

References Cited

UNITED STATES PATENTS

| | | | |
|---|---|---|---|
| 2,074,251 | 3/1937 | Braun | 180—79.1 |
| 2,424,288 | 7/1947 | Severy | 180—79.2 |
| 2,996,137 | 8/1961 | Chu et al. | 180—98 |
| 2,997,593 | 8/1961 | King | 250—202 |
| 3,172,496 | 3/1965 | Rabinow et al. | 180—98 |
| 2,999,938 | 9/1961 | Hann et al. | 250—202 |
| 3,302,198 | 1/1967 | Selvin et al. | 343—7 |

KENNETH H. BETTS, Primary Examiner

U.S. Cl. X.R.

180—79; 343—7; 250—202; 472—26